United States Patent [19]
Zambelli

[11] Patent Number: 5,184,711
[45] Date of Patent: Feb. 9, 1993

[54] APPARATUS FOR THE TRANSFER OF PASTA NESTS INTO PACKAGING CONTAINERS

[75] Inventor: Gabriele Zambelli, Forli, Italy

[73] Assignee: G.A.P. Technica S.R.L., Forli, Italy

[21] Appl. No.: 766,844

[22] Filed: Sep. 27, 1991

[30] Foreign Application Priority Data

Sep. 27, 1990 [IT] Italy .................................. 3665 A/90

[51] Int. Cl.⁵ ............................................. B65G 47/26
[52] U.S. Cl. .................................. 198/419.2; 198/740; 198/741; 198/468.1
[58] Field of Search ............. 196/419.2, 468.1, 468.11, 196/468.9, 432, 426, 419.3, 418.5, 740, 741, 692, 693

[56] References Cited

U.S. PATENT DOCUMENTS

| | | | |
|---|---|---|---|
| 2,279,837 | 4/1942 | Newlin | 198/740 |
| 2,815,112 | 12/1957 | Engleson et al. | 198/432 X |
| 3,140,776 | 7/1964 | Lsaver | 198/739 |
| 3,917,053 | 11/1975 | Matsuyama | 198/740 X |
| 4,340,137 | 7/1982 | Foster | 198/468.1 X |
| 4,508,149 | 4/1985 | Carroll | 198/692 X |
| 5,035,315 | 7/1991 | Fukusaki et al. | 198/419.2 |

FOREIGN PATENT DOCUMENTS 0153017 7/1987 Japan .............................. 198/468.11

Primary Examiner—D. Glenn Dayoan
Assistant Examiner—James R. Bidwell
Attorney, Agent, or Firm—Cohen, Pontani, Lieberman & Pavane

[57] ABSTRACT

The present invention relates to an apparatus for transferring pasta nests or skeins from drying frames to packaging containers. In particular, it relates to an apparatus having three consecutive and horizontal translators, the first two having vertically moveable nails or cramps and the third having a moveable checking side suitable as a whole to move parallel rows of pasta nests or skeins from frames and thereby laying them in packaging containers.

8 Claims, 4 Drawing Sheets

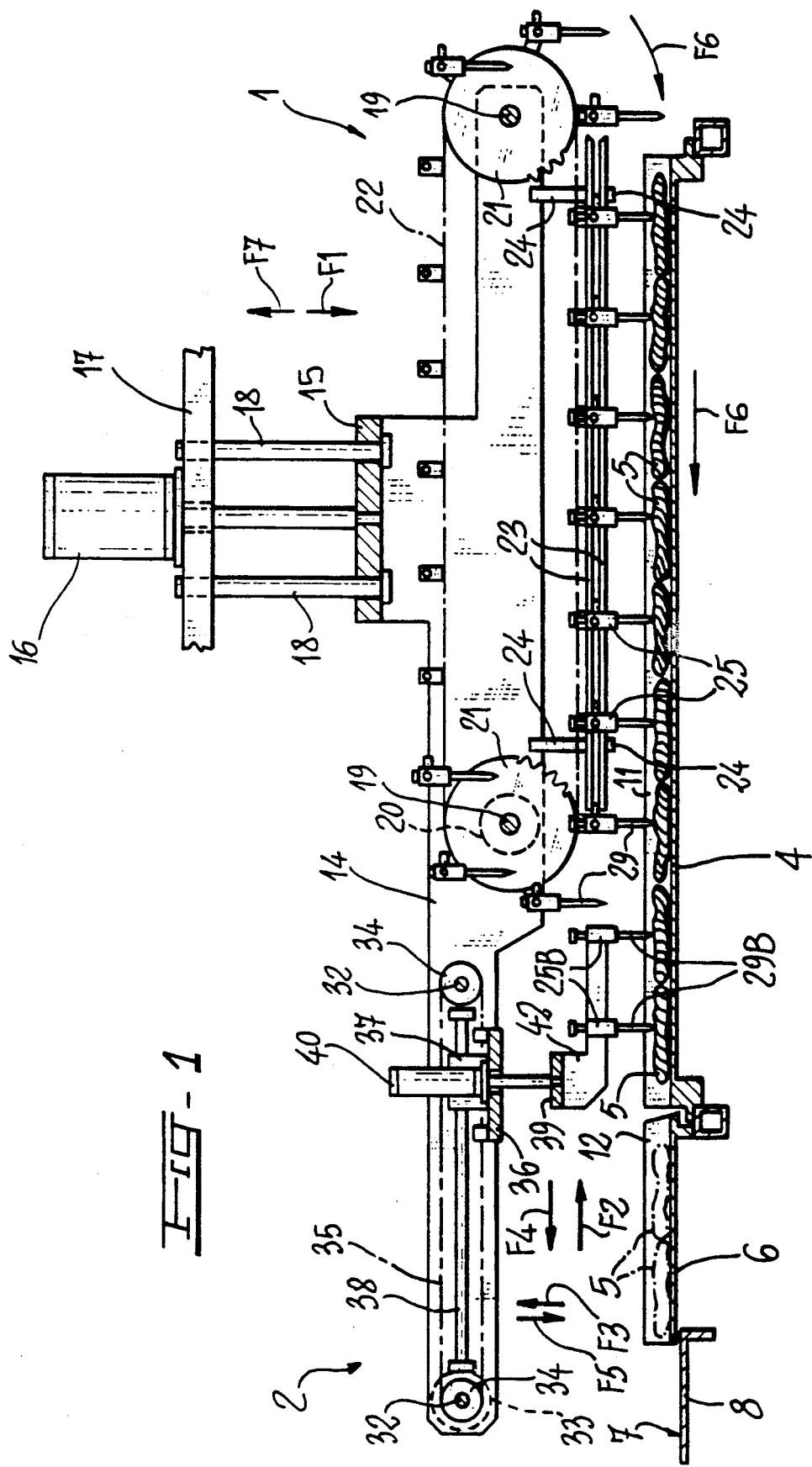

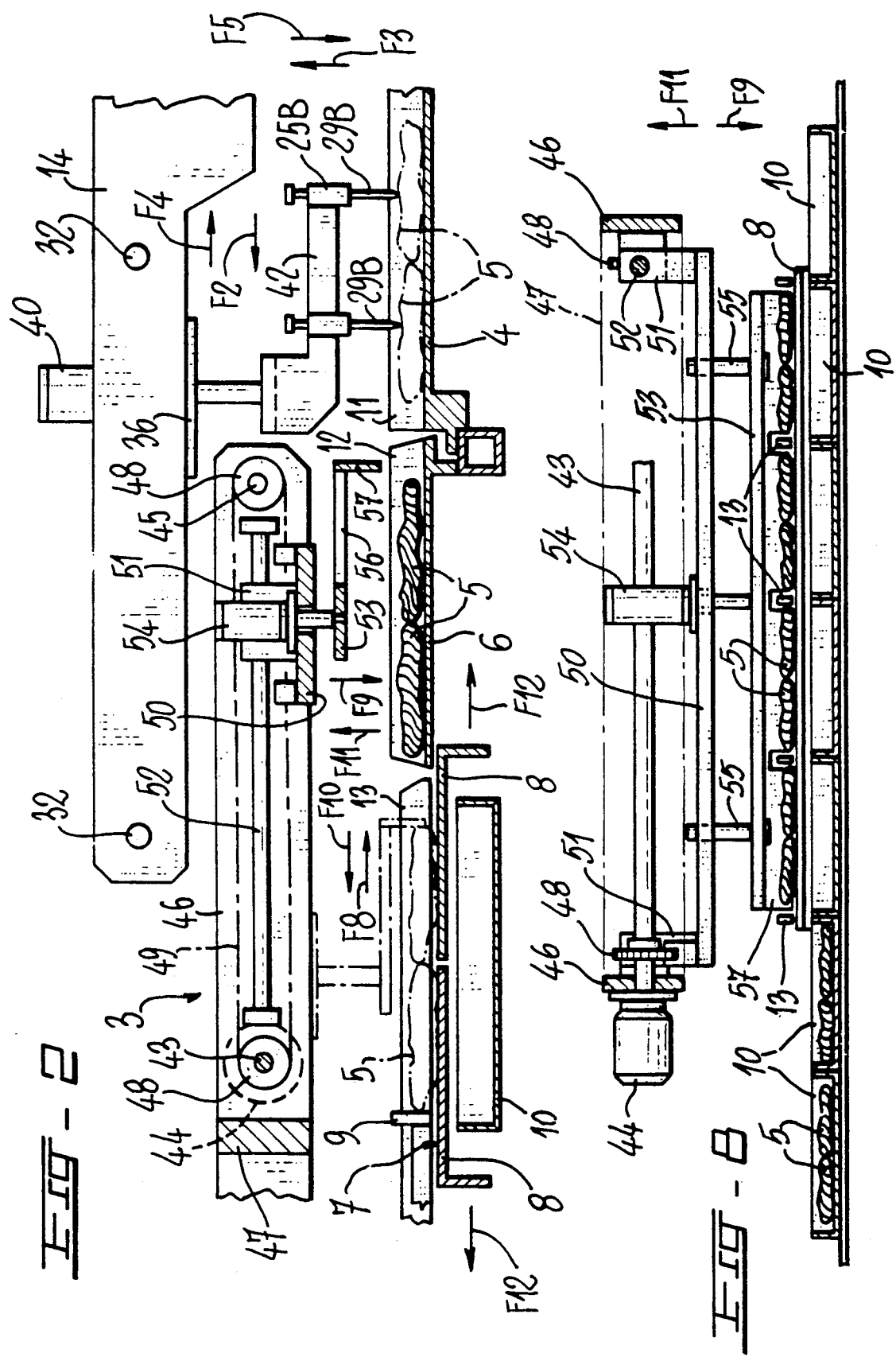

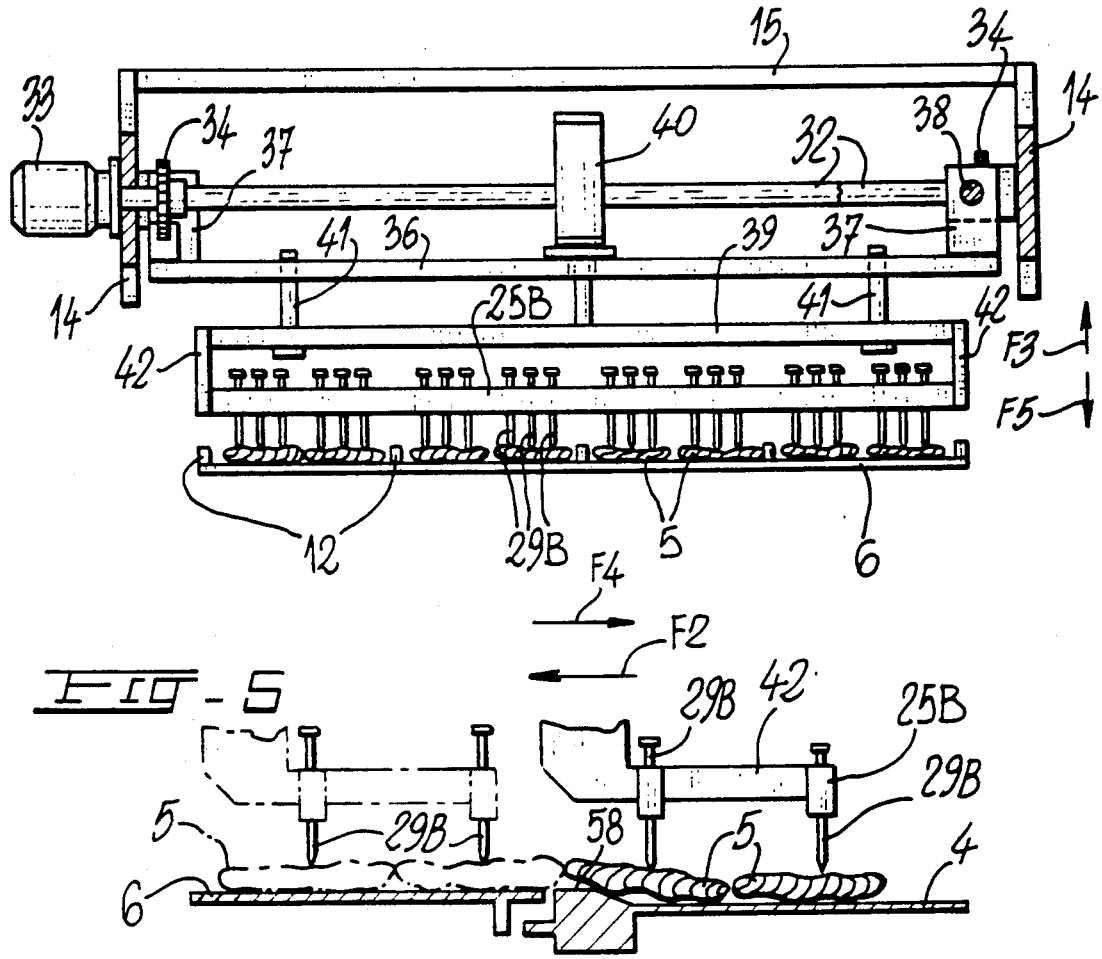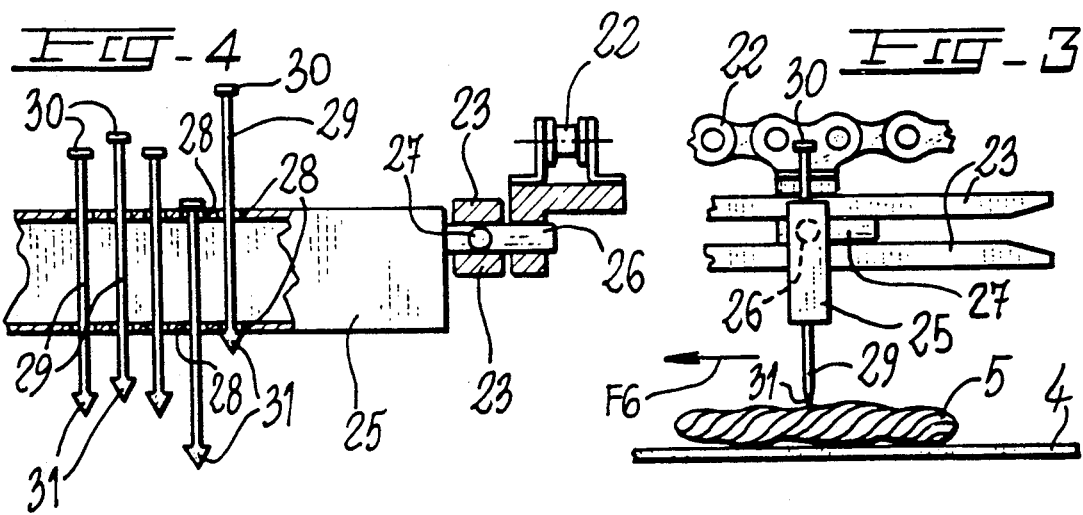

APPARATUS FOR THE TRANSFER OF PASTA NESTS INTO PACKAGING CONTAINERS

BACKGROUND AND SUMMARY OF THE INVENTION

The present invention relates to an apparatus for transporting and packaging nests or skeins of pasta from drying frames to packaging containers.

Within the same technical field, the applicant has already filed an application (IT 3567 A/89, corresponding to U.S. Pat. No. 07/556,822 and EP 90 11 4204.2) concerning an apparatus for automatically removing pasta nests from drying containers comprising a mechanism for interspacing groups of the nests on drying frames in checkerboard pattern with respect to interspaces between the adjacent groups; also included is a mechanism for entering into the mentioned interspaces, for translating the groups of the nests in a plane of the groups to respective locations at which the groups respectively pass through an opening transverse to the plane and into packaging containers.

In such an apparatus, the interspacing mechanism includes brushes which space the pasta nests so as to permit the translating mechanism, including brushes, to bring the formed groups of pasta nests out of the frame and place them on packaging points. These packaging and translating brushes are quite efficient; however if they are not changed after some period of time, they can lose bristles which may be transported into the packaging containers.

An object of the present invention is thus to provide an automatic pasta handling apparatus which moves the pasta nests from the drying frames without running the risk during prolonged use that foreign matter may be packaged with the product in the container.

Another object of the present invention is to provide a means for transporting and packaging nests or skeins without wasting the product itself, since the product must be delicately handled.

Still another object of the present invention is to provide an apparatus which is easy, efficient, works well and is relatively inexpensive.

All these objectives and many more can be achieved with the present invention. The apparatus of the invention relates to an apparatus for transferring pasta nests or skeins from drying frames to packaging containers, and more particularly, it relates to an apparatus which includes three consecutive and horizontal translators, the first two having vertically moveable nails or cramps and the third having a moveable checking side, and suitable as a whole to move parallel rolls of pasta nest or skeins from drying frames to packaging containers.

BRIEF DESCRIPTION OF THE DRAWINGS

Further characteristics and advantages of the apparatus in accordance with the invention will become more clear from the detailed description which follows of a preferred embodiment, and as shown by way of illustration and not of limitation in the accompanying drawings, in which:

FIG. 1 shows a side view of the first and second horizontal translator means according to the present invention;

FIG. 2 shows a side view of the second and third horizontal translator means according to the present invention;

FIG. 3 shows a detailed side view of the first horizontal translator means;

FIG. 4 shows a detailed front view of the first translator means as shown in FIG. 3;

FIG. 5 shows the movements of the second horizontal translator means on the product; and FIGS. 6, 7 and 8 respectively show the front view of the first, second and third horizontal translator means.

DETAILED DESCRIPTION OF THE PRESENTLY PREFERRED EMBODIMENT

Figure 6:
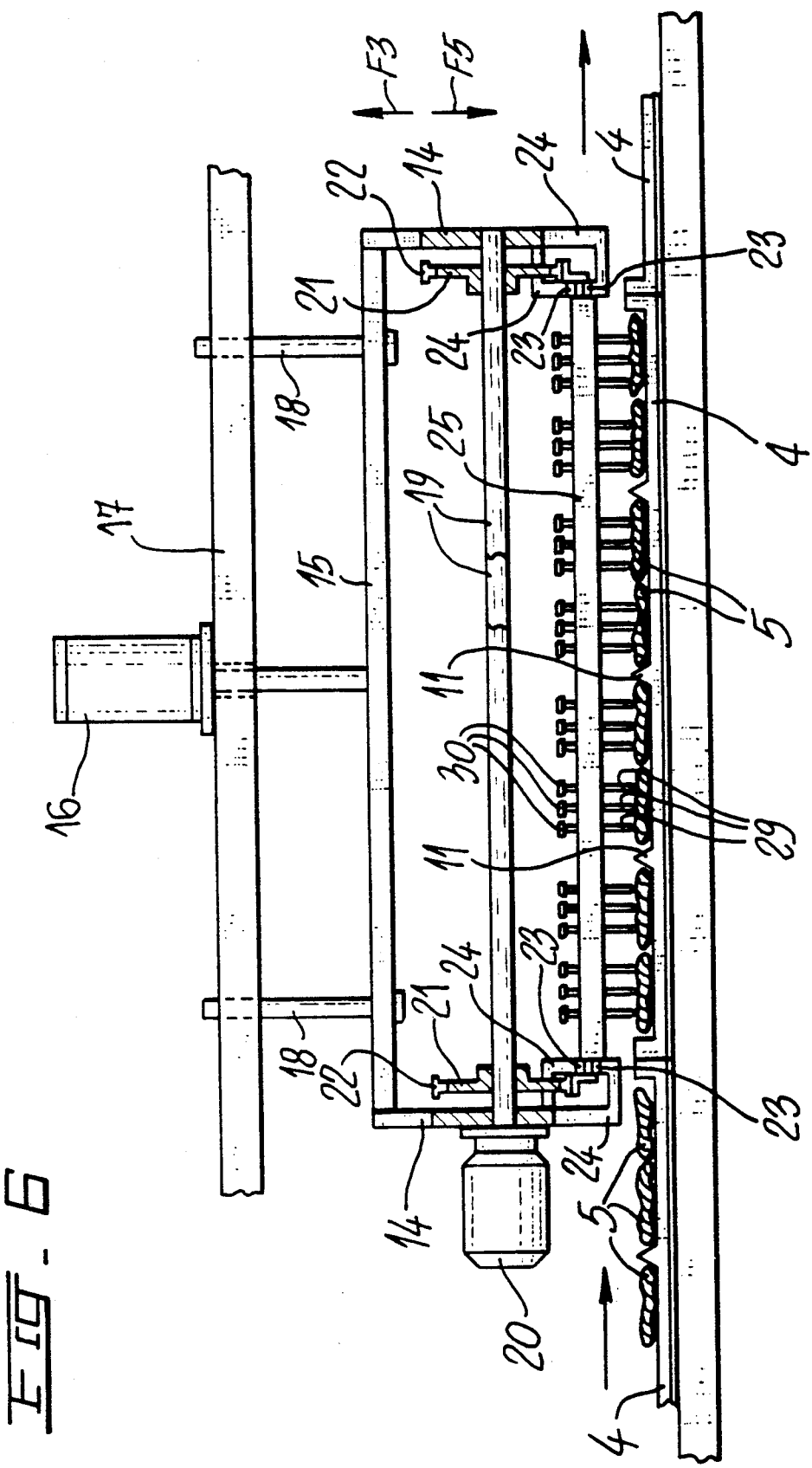

The first horizontal translator means is shown in FIG. 1 and is denoted generally as reference numeral 1 while the second translator means is indicated by reference numeral 2, and the third translator means is shown in FIG. 2 and denoted by reference numeral 3.

The first translator means is positioned in an overhanging arrangement over frame 4, of known type for drying pasta nests 5, and which is slidable in succession by successive steps over a track. The second translator means overhangs in part over a portion of said frame 4 and in part over co-planar bracket 6 (see also FIG. 2).

The third translator means is positioned below the second translator means and overhanging over a portion of bracket 6 and over a portion of co-planar, flap board 7 which is about as large as bracket 6 (see FIG. 2). The two wings 8 are disposed longitudinally and medianly dividable for opening wide apart by reciprocally sliding opposite each other. Over flap board 7, and on the opposite side to bracket 6, a side 9 is provided so as to position the nests above the two wings which slide one after the other over packaging containers 10 in a known manner (see FIG. 8).

The upper faces of frame 4, bracket 6 and wings 8 have respectively strips 11, 12 and 13, equally interspaced between each other and disposed longitudinally and consecutively and coinciding with the three faces of frame 4, bracket 6 and wings 8. (see FIGS. 6, 7, and 8) The first and second translator means (see FIG. 1) are supported together by two parallel plates 14 which are transversely coupled by a bridge 15 which is vertically and alternately moveable by a pneumatic piston 16 which in turn connects, along with a pair of vertical bars 18, bridge 15 to superior fixed beam 17.

The first translator means has a pair of parallel shafts 19, one of which is driven by a gear motor 20. In addition, shafts 19 are transversely pivoted in parallel plates 14 and are furnished with pinions 21 on which are wound two parallel chains 22 which in their lower stretch, run side to side with respect to a pair of guide bars 23 laid side by side and supported by arms 24 which are attached to parallel plates 14 (see also FIGS. 1 and 6).

The parallel chains 22 are transversely linked to the guide bars 23 one another by a plurality of equally interspaced parallel structure shapes 25 having a rectangular section and by the interposition of pins 26 between the two ends of shape 25 and in between guides 23 (see FIGS. 4 and 6).

Each pin 26 is furnished with one transverse tooth 27 (see FIG. 3), while every structure shape 25, longitudinally has a plurality of consecutive holes 28 where vertical nails or cramps 29 are interspaced equally in groups so as to correspond to a space bounded by strips 11 of frame 4 below (see FIG. 6).

The vertical nails or cramps 29 are vertically and freely slidable inside the respective holes 28. The nails or cramps are only limited in the extent of their movement by heads 30 and tips 31 which prevent the nails from becoming disengaged from support structure 25 (see FIG. 4).

The second translator means (see FIGS. 1, 2 and 7) is formed by two parallel shafts 32 one of which is driven by a gear 33 and which are transversely pivoted in parallel plates 14 (but preferably disposed higher than shafts 19 of the first translator means). In addition, parallel chains 35 are wound to pinions 34. Bridge 36 is moved by the chains in an alternate sense and guided by its block 37 and slidable along bar 38. The bridge 36 supports a plate 39 below, which is parallel to it and which is alternately and vertically moveable through the interposition of a pneumatic piston 40 between the plate 39 and the bridge 36 and the use of a pair of vertical bars 41. To the alternately and vertically moveable plate 39, there are assembled two parallel arms 42 projecting toward the first translator means 1. Moreover two parallel structural shapes 25b having rectangular sections are transversely connected to the arms 42, which are comparable to the parallel structural shapes 25 of the first translator means and have the same function. In addition, each of the structural shapes 25b longitudinally have a plurality of vertical nails or cramps 29b which are freely slidable and which are equally interspaced in groups so as to correspond to the space formed between strips 11 of frame 4 and strips 12 of bracket 6 below (see FIG. 7).

The third translator means (see FIGS. 2 and 8), is placed at a lower level with respect to the second translator means, and includes shaft 43, driven by a gear motor 44, and by two co-axial pivots 45, which communicate two parallel plates 46 and which are linked by a fixed cross-beam 47.

The two ends of shaft 43 and the pivots 45 are furnished with pinions 48 around which are wound two parallel chains 49. Bridge 50 is moved by chains 49 in an alternate way and guided by a block 51 sliding along bar 52.

In addition bridge 50 supports a plate 53 below and parallel to it, and which is alternately and vertically moveable through the use of a pneumatic piston 54 as well as the guidance of a pair of vertical bars 55 (see FIG. 8).

To the vertically and alternately moveable plate 53, there are assembled two parallel arms 56 projecting towards frame 4 and which connect transversely to a checking side 57 positioned below arms 56 and having a horizontal length transverse to strips 12 and 13 and which correspond to the boundary formed by parallel strips 12 of bracket 6 and strips 13 of flap board 7 (see FIG. 8). With regard to FIG. 5, an alternate embodiment of frame 4 is shown, in which the embodiment incorporates the use of an upswing edge 58 so as to facilitate the transfer of nests or skeins from a frame 4 to a bracket 6.

APPARATUS OPERATION

The apparatus of the present invention operates in the following manner. The drying frames, emerge from a drying chamber of known type, while sliding in succession by successive steps on tracks, and interposed in strips 11 are parallel rows of pasta nests 5 which are ready for trade. Each frame 4 when it arrives under the first translator means, has strips 11 aligned with strips 12 of side bracket 6. Frame 4 is then stopped for the time being so as to perform the following operations. The first and second translators means are lowered (see Arrow F1 of FIG. 1) by pneumatic piston 16 to which is hung bridge 15 and the relative plates 14 that support both. As the nails 29 of the first translator means and the nails 29b of the second translator means are lowered, the nails 29 and 29b are inserted between the threads of the pasta nest without damaging them. The pasta nests 5 are not damaged due to the minimal force applied to the nests 5. The force applied is equal to the weight of the nails 29 and 29b since the nails are freely slidable through the structural shapes 25 and 25b. It must be further noted that nails 29b of the second translator means engage the two parallel rows of pasta nests 5 more externally and proximally. Just as the first and second translator means are lowered into working position, the second translator means is activated by starting gear motor 33 so as to initiate shafts 32, pinions 34 and chains 35 and to bring bridge 36 away from frame 4 until it is between plates 46 of the third translator means (see Arrow F2 of FIGS. 1 and 2). As a result, the two more downstream rows of pasta nests 5 engaged by nails 29b, supported by bridge 36 with piston 40, plate 39, arms 42 and shapes 25b are removed from frame 4 and translated onto bracket 6 and between strips 12. After the two rows of pasta nests 5 are transferred onto bracket 6, the nails are removed by lifting pneumatic piston 40, plate 39 and arms 42 (see Arrow F3 of FIGS. 1 and 2). The second translator means is then positioned on a new pair of rows of pasta nests 5 which are more downstream on frame 4. To achieve the repositioning of the second translator means, gear motor 33 moves back bridge 36 (as shown in Arrow F4 of FIGS. 1 and 2) and the associated elements towards frame 4. After the rectangular shapes 25b move back and above two new parallel rows of pasta nests 5 which are more external and proximal, the rectangular shapes 25b and associated elements are lowered (see Arrow F5 of FIGS. 1 and 2) on these parallel rows of pasta nests by pneumatic piston 40. As the two rows of pasta nests 5 which are more downstream are taken away from the frame 4 by the second translator means, the first translator means starts to work with its nails 29 already engaged in all the rows of pasta nests 5 on frame 4, which were engaged during the contemporary descent of the first and second translator means. (see FIG. 1)

The start of the first translator means is driven by gear motor 20, which by a shaft 19 moves the parallel chains 22, structural shapes 25 and nails 29 in a direction as shown by Arrow F6 of FIG. 1. The rows of nails 29 as they move along the lower stretch of chain 22 are kept in a vertical position by teeth 27 of side pins 26 of the structural shapes 25. These structural shapes 25, at the upstream end of the lower stretch of chains 22 enter a path guide formed between guides 23 (see FIGS. 3 and 4) which prevent the angular movements of teeth 27 and nails 29. In this manner the consecutive rows of pasta nests 5 are transferred towards the second translator means where they are disengaged from the nails 29 at the downstream end of the lower stretch of chains 22 by vertically lifting nails 29 so as to disengage the vertical force applied by these nails. As the rows of pasta nests 5 arrive at the edge of frame 4, they are pushed by the following rows to a position where the previous first two rows of pasta nests were and which have already been removed. The second translator means takes them away as previously discussed until the entire rows of pasta nests 5 on frame 4 are finished. For this reason the last row of nails 29 act as picker of the eventually remaining products remaining behind so that it can be substituted by a checking side.

Afterwards, the first and second translator means are lifted up (see Arrow F7 of FIG. 1) by pneumatic piston 16 so as to permit another frame 4 to come into place and so that the first and second translator means can descend again so as to restart the entire operation over. Moreover, it must be noted that the removal speed of the two most downstream rows of pasta nests 5 acted on by the second translator means is higher than that of transfer speed of the first translator means so as to create an appropriate interspacing among the pair of rows removed and those still arriving, so as to be able to insert them separately into packaging containers for trade. Just as one pair of rows of pasta nests arrive on bracket 6, brought there by the second translator means, the moveable checking side 57 of third translator means descends to insert itself behind a pair of rows of pasta nests in the space formed as just described.

The activation of the third translator means is driven by a gear motor 44 which cooperates with a shaft 43. The gear motor 44 and the shaft 43 along with gear wheels 48 and chains 49 act to move the bridge 50 toward the second translator means (as shown in Arrow F8 of FIG. 2). During this operation the checking side 57, supported by bridge 50 with pneumatic piston 54, plate 53 and arms 56 arrives in a overhanging manner to the interspace behind the pair of rows of pasta nests on bracket 6. Then, the checking side 57 is brought to a descent by the pneumatic piston 54 until it enters the interspace.

The two rows of pasta nests 5 are so embraced by checking side 57 that the nests are taken away from bracket 6 and are translated onto wings 8 of the flap board 7 and between strips 13 by the alternate movement of gear motor 44 which gives an alternate movement to bridge 50 (see Arrow F10 of FIG. 2) and the associated elements supported by it. As the two rows of pasta nests 5 arrive on wings 8 of flap board 7, they are adjusted towards side 9. The checking side 57 then leaves the pasta nests in place, and is lifted by the pneumatic piston 54 so as to be ready to restart a new operation (see Arrow F11 of FIG. 2).

After the two rows of pasta nests 5 arrive, wings 8 of flap board 7 open wide apart (see Arrow F12 of FIG. 2) so as to permit the pasta nests 5 to fall below into a suitable number of packaging containers 10 which are brought (passed and stopped) below flap board 7 in a known manner. The flap board 7 is then closed again so as to restart the phase over again with another pair of rows of pasta nests 5. Finally, FIG. 5 shows how the vertically and freely moveable nails 29b of the second translator means according to the present invention, can easily remove the two rows of pasta nests from frame 4 onto bracket 6 even when the planes are not at the same level. As shown in FIG. 5, frame 4 is provided with an upswing edge 58 so as to facilitate the transferring of the pasta nests from frame 4 to bracket 6. Moreover, the free sliding of the nails 29 and the structural shapes 25 neutralize the difference in level as shown here.

It is obvious that even though in the above specification the pasta nests are grouped in rows of two, three or more rows can also be utilized. It is also obvious that the drive devices can be acted in a variety of ways, in particular the pneumatic pistons giving the vertical movement to the translators can be substituted by gear motors acting on a cam or by some other device of comparable function.

As it is evident from the above detailed description of the preferred embodiment, the device according to the present invention offers the advantages aimed, in particular it provides a delicate, effective and easy means for the automatic removal of pasta nests or skeins from drying frames while transporting them into packaging containers without sustaining breakage of the product.

It should be understood that the preferred embodiments and examples described are for illustrative purposes only and are not to be construed as limiting the scope of the present invention which is properly delineated only in the appended claims.

What is claimed is:

1. An apparatus for transferring pasta nests or skeins from drying frames into packaging containers comprising:
    a first suspended translator means for transferring a number of said nests (5) comprising at least one first structural shape (25) a plurality of consecutively adjoining and vertically and horizontally moveable parallel rows of nails (29) mounted on said structural shape (25), said nails (29) being independently, vertically and freely slidable within said structural shape (25);
    a second suspended translator means for transferring a number of said nests (5) from said first translator means comprising a second structural shape (25B), at least one row of horizontally and vertically moveable and parallel nails (29B) and mounted on said structural shape (25B) as to be independently, vertically and freely slidable within said structural shape (25B), said at least one row of nails (25B) being parallel and adjacent to said rows of nails (25) of said first translator means; and
    a third translator means for transferring a number of said nests (5) from said second translator means comprising, at least one checking side (57) parallel and adjacent to said row of nails (29B) of said second translator means, and said checking side (57) being horizontally and vertically moveable.

2. The apparatus according to claim 1, further comprising a means for vertically suspending and vertically moving said first and second translator means.

3. The apparatus according to claim 1, wherein said pasta nests (5) are transferred in a direction of movement away from said first translator means and towards said second and third translator means, said first translator means being suspended above a frame (4), a bracket (6) positioned downstream from said frame (4), a flap board (7) positioned downstream from said bracket (6), said second translator means suspended above said bracket (6) and said frame (4), and said third translator means suspended above said bracket (6) and said flap board (7).

4. The apparatus according to claim 1, said first translator means comprising a plurality of structural shapes (25) and two chains, the structural shapes being positioned longitudinally transverse to the two chains, said rows of nails being arranged one after the other in said structural shape (25) and said first translator means further comprising a first shaft, a second shaft, a pinion attached to each of said first and second shafts, and a gear motor attached to said first shaft, said chains wrapped around the pinion of said first shaft and around the pinion of said second shaft for moving said structural shape (25) and said nails (29) alternately and substantially horizontally.

5. The apparatus according to claim 1, wherein said second translator means further comprises a hanging arm (42) attached substantially transverse to said structural shape (25B), a pneumatic piston for vertically moving said hanging arm, a chain, a first shaft, a second shaft, a pinion attached to each of said first and second shafts, and a gear motor attached to said first shaft, said chain being wrapped around the pinion of said first shaft and around the pinion of said second shaft for moving said structural shape (25B) and said nails alternately and substantially horizontally, and said structural shape (25B) being disposed on said hanging arm (42) substantially transverse to said chain.

6. The apparatus according to claim 1, wherein said third translator means further comprises a pneumatic piston (54) for alternately and vertically moving said checking side (57), a chain, a pivot, a shaft, a pinion attached to said shaft and said pivot, and a gear motor attached to said shaft, said chain being wrapped around said pinion of said shaft and around said pinion of said pivot for moving alternately and substantially horizontally said checking side (57).

7. The apparatus according to claim 4, further comprising a pair of parallel guides (23) for keeping said rows of nails substantially vertical, said parallel guides (23) being longitudinally spaced apart so as to form a guide path therebetween and disposed below said chain; a pin having a first end and a second end, said first end connected to said chain and said second end disposed transverse to said parallel guides and through said guide path and connected to said structural shape (25), and a tooth (27) connected substantially transverse to said pin and disposed substantially within said guide path and substantially parallel to said parallel guides.

8. The apparatus according to claim 1, further comprising a frame (4) with side strips (11), a bracket (6) with side strips (12), and a flap board (7) with side strips (13), said side strips (11, 12, 13) of said frame (4), bracket (6) and flap board (7), being arranged for grouping said nests and limit said nests (5) from moving in a direction transverse to a direction of movement of said nails (29, 29B) and said checking side (57), while said nests are transferred from said first translator means to said second translator means to said third translator means.

* * * * *